United States Patent [19]

Carbonel et al.

[11] 4,002,564
[45] Jan. 11, 1977

[54] CATION-EXCHANGE RESINS HAVING CROSS-LINKED VINYL AROMATIC POLYMER MATRIX WITH ATTACHED AMINO ALKYLENE PHOSPHONIC ACID GROUPS, THEIR USE, AND PREPARATION

[75] Inventors: Jack Carbonel; Paul D. A. Grammont; Jean E. E. Herbin, all of Chauny, France

[73] Assignee: Diamond Shamrock Corporation, Cleveland, Ohio

[22] Filed: July 23, 1975

[21] Appl. No.: 598,526

[30] Foreign Application Priority Data

July 24, 1974 France .............................. 74.25610

[52] U.S. Cl. .......................... 210/38 R; 75/101 BE; 260/2.2 R; 526/27
[51] Int. Cl.$^2$ .................. C08F 212/08; C08F 8/40; C22B 3/00
[58] Field of Search ..................... 260/2.2 R, 2.2 C; 75/101 BE; 526/287, 27; 210/38

[56] References Cited

UNITED STATES PATENTS

| | | | |
|---|---|---|---|
| 3,001,868 | 9/1961 | Avestou et al. | 75/101 BE |
| 3,257,479 | 6/1966 | Irani | 260/243 B |

FOREIGN PATENTS OR APPLICATIONS 385,977   6/1973   U.S.S.R.

Primary Examiner—Joseph L. Schofer
Assistant Examiner—Peter F. Kulkosky
Attorney, Agent, or Firm—Timothy E. Tinkler

[57] ABSTRACT

Described is an ion exchange resin prepared from a cross-linked vinyl-aromatic polymer carrying recurring active units of the formula —$CH_2NHRPO(OH)_2$ wherein R is a lower alkylene radical. Such resins are useful in selectively removing metal ions from solutions, and may be prepared, e.g., by reaction of a primary amino-substituted cross-linked copolymer with a phosphorus trihalide and a simple ($C_1$-$C_3$) aldehyde.

5 Claims, No Drawings

CATION-EXCHANGE RESINS HAVING CROSS-LINKED VINYL AROMATIC POLYMER MATRIX WITH ATTACHED AMINO ALKYLENE PHOSPHONIC ACID GROUPS, THEIR USE, AND PREPARATION

BACKGROUND OF THE INVENTION

Considerable demand exists for cation-exchange resins capable of selectively removing metallic ions from solution. One field of application is the area of hydrometallurgy, wherein it is the object to prepare concentrated solutions of the desired metal (e.g., copper, cobalt, nickel, or zinc) or in the extraction of precious metals from solution (such as gold, silver, or platinum). Such resins also find utility in the removal of impurities from electroplating baths, the regeneration of acids used in metal stripping, and the purification of water and various aqueous wastes.

While conventional cation-exchange resins remove metallic ions from aqueous solution quite readily, their use is limited since they act relatively nonselectively, thus requiring a succession of elution steps with suitable chemical reagents to obtain the desired metal.

A number of selective cation-exchange resins have been proposed. For example, U.S. Pat. No. 2,888,441 and 2,875,162 describe cross-linked polymers having alpha-amino carboxylic acid groups. In U.S. Pat. No. 3,345,344 the preparation of high molecular weight resins containing polyhydroxamic acid groupings from polyamidoximes is described. Further, the preparation of various condensation products, such as hydroxyquinoline-formaldehyde, resorcinol-formaldehyde, and salicylic acid-formaldehyde is known.

Such resins also have some limitations. In the case of the addition polymer materials, good mechanical and chemical stability are found, but a generally insufficient exchange rate is noted. In the case of condensation products, mechanical-chemical stability is questionable and, in addition, the process may often result in modification of the chelating or complexing groups.

STATEMENT OF THE INVENTION

Therefore, it is an object of the present invention to provide a cation-exchange resin capable of selectively removing metallic ions from aqueous solution.

It is a further object of the present invention to provide a process for preparing such cation exchangers, which process optimizes yield and exchange capacity.

These and further objects of the present invention will become apparent to those skilled in the art from the specification and claims which follow.

There has now been found a cation-exchange resin, particularly useful in the selective removal of metallic ions from aqueous solution, which resin comprises a cross-linked vinyl aromatic copolymer containing a plurality of $-CH_2NHRPO(OH)_2$ groups wherein R is a $C_1-C_3$ alkylene group. It has been found that such resins may be effectively prepared, for example, by aminating a chlormethylated styrene-divinylbenzene polymer backbone to form a primary amine and then reacting said primary amine group with a suitable phosphonating agent and an aldehyde, ketone, or precursor thereof to form the aminoalkylene-phosphonate resin. Particularly effective is the preparation of such resins with a phosphorus trihalide as the phosphonating agent.

The resins have been found to be quite selective in removing metallic ions from aqueous solution, have good chemical and mechanical stability, and quite acceptable exchange rates and capacities. Furthermore, the resins prepared employing phosphorus trihalide as the phosphonating agent are obtained in greater yields and have higher capacities than with other phosphonating techniques.

DESCRIPTION OF THE PREFERRED EMBODIMENTS

The cross-linked vinyl-aromatic copolymer matrices of this invention are those already known to those skilled in the art as forming the matrix for a number of ion exchange resins. Often, and preferably in the present invention, these will be styrene-divinylbenzene copolymers but other vinyl aromatics (e.g., vinyl toluene and vinylxylenes) and cross-linkers (e.g., ethylene glycol dimethacrylate, trimethylolpropane trimethacrylate, and trivinylbenzene) may be used. For convenience, a styrene-DVB copolymer backbone (matrix) will often be referred to hereinafter. Typically, these particulate solid resins are obtained in bead form and contain from 1 to 25 percent of the cross-linking agent. These matrices may either be of the gel-type or can be rendered macroporous by methods known to those skilled in the art.

Also well known is the chloromethylation of such polymers where necessary, in order to introduce the group $-CH_2Cl$ onto the aromatic nuclei, thus providing a site for subsequent introduction of an active ion-exchange group. Of course, if such a site is already present, e.g., from the use of a monomer such as vinylbenzene chloride, one may proceed directly.

Once the chloromethylated styrene-DVB polymer, for example, is obtained, the next step involves the formation of a primary amine group in place of the chloride ion. Known techniques for the selective formation of primary amines may be used. For example, the Hoffman reaction for the degradation of amides may be employed. Also useful is the Gabriel synthesis wherein potassium phthalimide is reacted with the alkyl halide group, followed by hydrolysis of the resultant N-alkyl imide. Other methods for the introduction of primary aminoalkyl groups into the styrene-DVB copolymer may be found in the following publications, the teachings of which with respect thereto are incorporated herein by reference: Encyclopedia of Polymer Science and Technology (vol. 1), French Pat. Nos. 1,312,060; 1,415,438; and 2,162,672; British Patent 1,036,239. Alternatively, bis-dicarbonimidoalkyl ether, N-haloalkylimides, N-Hydroxyalkylimides or other acylaminomethylating agents may be used to prepare the primary amino substituted polymer directly. Each of the foregoing methods leads to the formation of a crosslinked polymer bearing recurring units of the following structure:

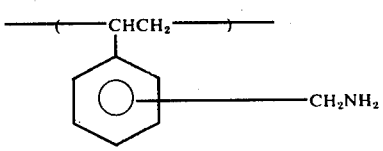

It remains now to convert the primary amine function to the desired amino-alkylene phosphonic acid form. This reaction again may be accomplished in a variety of ways by techniques known to those skilled in the art of organic chemistry but not thought to have previously been applied to the formation of ion-exchange resins.

One process is described in the following publications, the specifics of which are incorporated herein by reference:

M. I. Kabachnik and T. Ya. Medved, Doklady Akad. Nauk. SSSR, 1952;

M. I. Kabachnik and T. Ya. Medved, Izvest. Akad. Nauk. SSSR, Chemical Science Section, 1953; K. A. Petrov, Zhur. Obschei. Khim., 1959 (Journal of General Chemistry). The described process consists of reacting phosphites, alkyl-phosphites, or dialkyl-phosphites with aldehydes or ketones in ammonia-alcohol. On acid hydrolysis the amino-alkylene phosphonic acid compound is obtained. While useful, the reaction yields and physical-chemical properties of the resultant products are of borderline commercial use.

In another general process for accomplishing the desired alkylene-phosphonation, a reactive nitrogen compound (ammonia, amines, amine salts, alpha-amino acids, amino acid salts, or amines of carboxylic acids) is reacted with a carbonyl compound (an aldehyde or ketone of the formula RCHO or $R_2CO$) and a phosphonating agent (phosphorus acid, phosphites, alkyl or dialkyl phosphites, or phosphorus halides).

It has been found, however, that the optimum process for the preparation of amino-alkylene phosphonate cation-exchange resins involves the use of a phosphorus trihalide as the phosphonating agent together with an aldehyde or ketone of the formula RCHO or $R_2CO$, wherein R is $C_1$–$C_3$ lower alkyl. Aldehyde or ketone precursors, such as trioxane, are often used. This reaction, conducted in aqueous medium, is not only simpler and less dangerous than employing other phosphonating agent, since its decomposition in-situ yields the required orthophosphorous and hydrochloric acids, but a better reaction yield of a resin having a higher capacity is also obtained. Further, the generally required use of an excess of, for example, hydrochloric acid, is avoided.

Use of the cation-exchange resin product of the present invention in the removal of metallic ions from aqueous solution is then conventional in so far as operating conditions are concerned, such as pH, temperature, concentration, and the like.

In order that those skilled in the art may more readily understand the present invention and certain preferred embodiments by which it may be carried into effect, the following specific examples are afforded.

EXAMPLE 1

Into a cooled reactor equipped with an agitator are introduced 800 ml of a chloromethylated polystyrene-6% divinylbenzene resin, 960 ml methylal (swelling agent), 600 g of hexamethylenetetramine (aminating agent), and 300ml of distilled water. The reaction proceeds by maintaining at reflux temperature for 4 hours, following which the beads are filtered and washed with distilled water. After reintroduction of the beads to the reactor, 1200 ml of 32% hydrochloric acid is added and the mixture is refluxed for 1 hour. Upon filtration, washing, and rinsing, there results 1200 ml of the hydrogen chloride salt of an aminated resin having an exchange capacity of 2.8 equivalents per kilogram, and the primary amine groups being of the formula -$CH_2NH_2$.

To this 1200 ml of aminated resin is then added 580 g of pure orthophosphorous acid, 160 trioxymethylene (sym-trioxane), 300 g of hydrochloric acid (32%), and sufficient water to provide a slurry. Reaction proceeds at reflux temperature for 1 hour. After filtration, washing, and rinsing, there is obtained 1215 ml of the desired amino-alkylene-phosphonated cation-exchange resin having recurrent units of the formula:

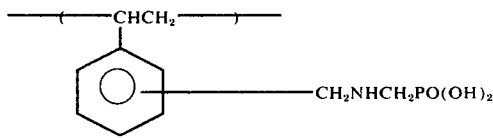

and a capacity of 4.0 equivalents per kilogram, in the sodium form.

The capacity of this resin is evaluated by preparing synthetic 0.1 normal solutions of copper and nickel in water and passing these solutions over 10 milliliters of the resin in the sodium form. It is found to be capable of fixing 41.4 g/l of copper or 44 g/l of nickel at a pH of 4 and 54 or 49 g/l, respectively, at a pH of 6.

EXAMPLE 2

An additional 1200 ml of aminated resin is prepared as in Example 1. This resin is then reacted with 700 g of phosphorus trichloride, 160 g trioxymethylene, and sufficient water as above. Reaction again proceeds at reflux for 1 hour to yield, after appropriate recovery steps, 1225 ml of a cation-exchange resin of the same formula as in Example 1, but having an exchange capacity of 4.4 equivalents per kilogram, in the sodium form. On evaluation under identical conditions, this resin is found to have a capacity of 44 g/l of copper and 47 g/l of nickel at a pH of 4 and 58 and 52.5 g/l, respectively, at a pH of 6. In addition to the increased yield and capacity employing $PCl_3$, the process advantages are apparent.

We claim:

1. A cation-exchange resin having a cross-linked vinyl aromatic polymer matrix and characterized, in the acid form, by active groups attached to the aromatic rings of the formula: -$CH_2NHRPO(OH)_2$, wherein R is $C_1$–$C_3$ lower alkylene.

2. A resin as in claim 1 wherein R is methylene.

3. A resin as in claim 1 wherein said matrix is a copolymer of styrene and divinylbenzene.

4. A resin as in claim 1 wherein said matrix is macroporous.

5. A process for removing metal ions from aqueous solution, which process comprises contacting said solution with a particulate cation-exchange resin which is a cross-linked vinyl aromatic polymer matrix, characterized by aromatic rings bearing groups of the formula: -$CH_2NHRPO(OH)_2$, wherein R is $C_1$–$C_3$ alkylene.

* * * * *

Dedication 4,002,564.—*Jack Carbonel; Paul D. A. Grammont; Jean E. E. Herbin*, all of Chauny, France. CATION-EXCHANGE RESINS HAVING CROSS-LINKED VINYL AROMATIC POLYMER MATRIX WITH ATTACHED AMINO ALKYLENE PHOSPHONIC ACID GROUPS, THEIR USE, AND PREPARATION. Patent dated Jan. 11, 1977. Dedication filed May 8, 1989, by the assignee, Rohm and Haas Co.

Hereby dedicates to the Public the entire term of said patent.

[ *Official Gazette July 25, 1989* ]